United States Patent

Yamashita et al.

[11] 4,186,382
[45] Jan. 29, 1980

[54] SWITCHING NETWORK

[75] Inventors: Hidetaka Yamashita, Kamakura; Yuji Miura, Yokohama, both of Japan

[73] Assignee: Hitachi, Ltd., Japan

[21] Appl. No.: 795,450

[22] Filed: May 10, 1977

[30] Foreign Application Priority Data

May 10, 1976 [JP] Japan .................................. 51-52205

[51] Int. Cl.² ............................................. H04Q 3/50
[52] U.S. Cl. .......................... 340/166 R; 179/18 GF; 307/256
[58] Field of Search ............. 340/166 R; 179/18 GF; 307/256

[56] References Cited

U.S. PATENT DOCUMENTS

| 3,201,520 | 8/1965 | Bereznak | 340/166 R |
|---|---|---|---|
| 3,546,394 | 12/1970 | Platt et al. | 340/166 R |
| 3,941,940 | 3/1976 | Ahmed | 179/18 GF |
| 3,942,040 | 3/1976 | Okuhara | 179/18 GF |
| 4,053,716 | 10/1977 | Enomoto | 179/18 GF |
| 4,057,691 | 11/1977 | Goto et al. | 179/18 GF |

Primary Examiner—Donald J. Yusko
Attorney, Agent, or Firm—Craig and Antonelli

[57] ABSTRACT

In a switching network having cross-points constituted by semiconductor switch elements of four-layer structure of PNPN, communication channels are connected in an unbalanced configuration, and all vertical or column buses and horizontal or row buses constituting the switching matrix are individually grounded through respective capacitors, whereby the semiconductor switch elements are inhibited from erroneous firings due to application of voltages having a high raise-up rate such as high frequency noises, thereby to protect the switching network from erroneous switching operations without increasing cross-talk.

3 Claims, 3 Drawing Figures

SWITCHING NETWORK

The present invention relates in general to a switching or exchange network in which semiconductor switch elements of four-layer structure of PNPN are disposed at cross-points and in particular to a circuit for preventing such semiconductor switch elements of four-layer structure from being erroneously fired due to the rate effect thereof.

The present invention will be described in conjunction with the accompanying drawings, in which.

It is known that semiconductor switch devices or elements and in particular semiconductor elements of four-layer structure of PNPN are employed at cross-points of switching or exchange networks in place of conventional mechanical crossbar switches. A PNPN diode is an example of such a semiconductor switch element. However, the diode of this type has a unique firing characteristic in respect of the rate effect (dv/dt effect). Thus, when a voltage having a high raise-up or transition rate such as noise voltage of a high frequency is applied to the PNPN diode, firing of the diode will undesirably occur even if the applied voltage is lower than a threshold level required for the correct firing of the diode. Accordingly, in the case of the switching network in which the PNPN diodes are employed at the cross-points in place of the mechanical crossbar contacts, such erroneous firing will often give rise to erroneous connections among communication channels, eventually involving shut-down of the whole system.

Figure 1:
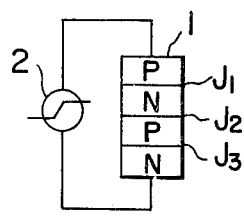
FIG. 1 is a schematic circuit diagram to illustrate the rate effect of a PNPN diode.

Referring to FIG. 1, the rate effect of a PNPN semiconductor element or diode which involves the erroneous firing can be explained by the fact that a transient current will flow through capacitance of a second junction $J_2$ of the PNPN element 1 in the reverse-biased state. In FIG. 1, reference numeral 2 denotes a signal source, while symbols $J_1$ and $J_3$ denote first and third junctions of the PNPN diode, respectively.

Figure 2:
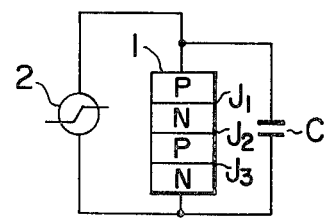
FIG. 2 shows a hitherto known circuit for preventing a PNPN diode from being erroneously fired due to the rate effect thereof.

Accordingly, when a capacitor C having a large capacitance as compared with the junction capacitance at the second junction $J_2$ is connected in parallel with the PNPN diode as is shown in FIG. 2, the transient current will be inhibited from flowing through the second junction, whereby the erroneous firing of the diode can be suppressed. However, it is noted that such connection of large capacitors C to the PNPN diodes which constitutes the cross-points of the switching network in a matrix array will in turn tend to increase undesirably the cross-talk to an impractical level.

An object of the present invention, therefore, is to provide a switching or exchange network which comprises semiconductor switch elements having a four-layer structure of PNPN disposed at cross-points thereof and which is protected from erroneous switching operations due to the erroneous firings of the semiconductor switch elements without increasing cross-talk between the communication channels.

According to the present invention, there is provided a switching network having cross-points constituted by semiconductor switch elements having a four-layer structure of PNPN, in which communication channels are connected in an unbalanced configuration and capacitors are connected between the ground and individual horizontal and vertical buses of said switching network respectively.

Figure 3:
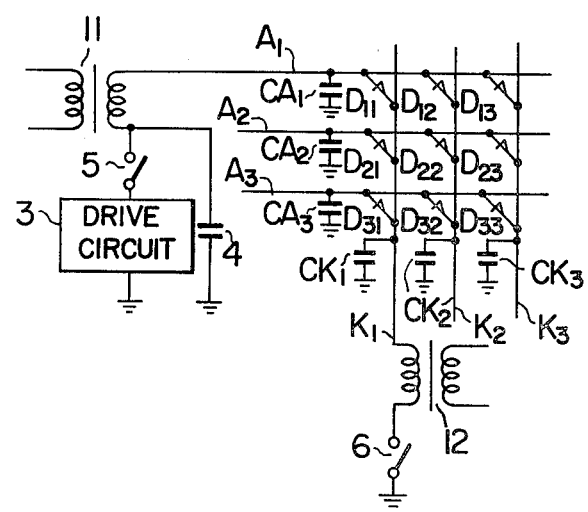
FIG. 3 is a circuit diagram showing a circuit arrangement of a switching network according to an embodiment of the present invention.

Now, the present invention will be described in conjunction with a preferred embodiment thereof. Referring to FIG. 3 which shows for the sake of illustration a switching network of a single stage connection in a matrix array of 3×3 cross-points, reference numerals 11 and 12 denote transformers which serve to transmit therethrough only signals and isolate the switching network from transmission lines in terms of d.c. conditions. Reference numeral 3 denotes a drive circuit for supplying a firing current to PNPN diodes $D_{11}$, $D_{12}$, . . . , $D_{33}$ connected at the cross-points of the switching network and for supplying a holding current. Numeral 4 denotes a by-pass capacitor for the signals, while numerals 5 and 6 denote a part of switches for selectively firing PNPN diodes $D_{11}$, $D_{12}$ . . . , $D_{33}$ constituting the cross-points. Capacitors $CA_1$, $CA_2$ and $CA_3$ are connected between the ground potential and horizontal or row buses $A_1$, $A_2$ and $A_3$, respectively. Capacitors $CK_1$, $CK_2$ and $CK_3$ are connected between the ground and the vertical or column bus buses $K_1$, $K_2$ and $K_3$, respectively.

In operation, when the switches 5 and 6 are turned on to fire the PNPN diodes $D_{11}$, a signal can be transmitted through the conductive diode $D_{11}$ from the transformer 11 to the other transformer 12 or vise-versa. Since the horizontal and vertical buses $A_1$, $A_2$, $A_3$ and $K_1$, $K_2$, $K_3$ are grounded through the respective capacitors $CA_1$, $CA_2$, $CA_3$ and $CK_1$, $CK_2$, $CK_3$, noise signals as appearing on the horizontal or vertical buses from some noise sources which are grounded can be filtered to the ground through the individual capacitors $CA_1$ and $CK_1$. On the other hand, noises from non-grounded sources such as electromagnetic waves are led to the earth through the capacitor $CA_1$ and then through the capacitor $CK_1$. In this manner, no noises are permitted to flow to the PNPN diode $D_{11}$ which is thus protected from erroneous firing.

As will be appreciated from the foregoing description, the PNPN diodes which are likely to be erroneously fired due to the intrinsic rate effect thereof can be employed in the switching network at the cross-points with an improved reliability in accordance with the teachings of the present invention.

We claim:

1. A switching network comprising:
   A plurality of horizontal buses and a plurality of vertical buses as unbalanced lines;
   a plurality of semiconductor switches of four-layer structure of PNPN provided as cross-points between said individual horizontal and vertical buses respectively, wherein each of said semi-conductor switches has a predetermined threshold level;
   a first group of switches connected with said horizontal buses, respectively, for selecting a desired one of said horizontal buses;
   a second group of switches connected with said vertical buses, respectively, for selecting a desired one of said vertical buses;
   drive circuit means connected with one of said first and second switch groups for firing a selected one of said semiconductor switches by the application of a voltage higher than the threshold level of the semiconductor switch through the switch group and supplying a holding current flow therethrough; and capacitors continuously connected between the ground and said individual horizontal and vertical buses respectively, to prevent noise from either grounded or non-grounded sources from flowing in any of the semiconductor switches, thereby preventing erroneous firing of the semiconductor switches resulting from a rate effect due to the noise.

2. A switching network as set forth in claim 1, wherein said semiconductor switch comprises a PNPN diode.

3. A switching network as set forth in claim 2, wherein each of said capacitors connected between the ground and the individual horizontal and vertical buses has a large capacitance as compared with a junction capacitance at an intermediate junction among three junctions of said PNPN diode.

* * * * *